(12) United States Patent
Lee et al.

(10) Patent No.: US 7,944,537 B2
(45) Date of Patent: *May 17, 2011

(54) THIN FILM TRANSISTOR ARRAY PANEL FOR LIQUID CRYSTAL DISPLAY

(75) Inventors: Chang-Hun Lee, Suwon (KR); Eun-Hee Han, Seoul (KR); Hak-Sun Chang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/567,297

(22) Filed: Sep. 25, 2009

(65) Prior Publication Data

US 2010/0039599 A1 Feb. 18, 2010

Related U.S. Application Data

(63) Continuation of application No. 11/954,121, filed on Dec. 11, 2007, now Pat. No. 7,609,351, which is a continuation of application No. 10/725,133, filed on Dec. 1, 2003, now Pat. No. 7,317,503.

(30) Foreign Application Priority Data

Dec. 3, 2002 (KR) .............................. 2002-0076356

(51) Int. Cl.
*G02F 1/1343* (2006.01)
(52) U.S. Cl. ......................... 349/141; 349/145; 349/146
(58) Field of Classification Search .................. 349/141, 349/145, 146
See application file for complete search history.

(56) References Cited

U.S. PATENT DOCUMENTS

| | | | |
|---|---|---|---|
| 5,745,207 A | 4/1998 | Asada et al. |
| 6,201,273 B1 | 3/2001 | Wang et al. |
| 6,256,081 B1 | 7/2001 | Lee et al. |
| 6,266,116 B1 | 7/2001 | Ohta et al. |
| 6,512,565 B1 | 1/2003 | Lee et al. |
| 6,646,707 B2 | 11/2003 | Noh et al. |
| 6,806,930 B2 | 10/2004 | Moia |
| 2001/0040647 A1 | 11/2001 | Song et al. |
| 2002/0044246 A1 | 4/2002 | Moon et al. |
| 2002/0044249 A1 | 4/2002 | Hirota |
| 2002/0113936 A1 | 8/2002 | Yanagawa et al. |
| 2002/0154079 A1 | 10/2002 | Shiota et al. |

FOREIGN PATENT DOCUMENTS

CN 1359026 7/2002

(Continued)

*Primary Examiner* — Wen-Ying P Chen
(74) *Attorney, Agent, or Firm* — F. Chau & Associates, LLC

(57) ABSTRACT

Disclosed is a liquid crystal display capable of high quality image and bright display. Gate signal lines are curved at near switching elements of the liquid crystal display. A pixel area is defined by the gate signal lines and their intersecting data signal lines. Pixel electrodes and common electrodes are disposed along a longitudinal direction of a pixel. A pixel signal and a common signal line is connected to the pixel electrode and the common electrode respectively. A storage capacitor may be formed in the middle of a longitudinal direction of the pixel, or where generally a texture may arise during display. One half of the pixel may be symmetrical with the other half with respect to the storage capacitor. A common signal line may be parallel with the data signal line and be disposed nearer to the data signal line than a pixel signal line. The pixel may be disposed symmetrically with respect to the data signal line therebetween. The pixel shape may also be repeated in the direction of the gate signal line.

44 Claims, 4 Drawing Sheets

FOREIGN PATENT DOCUMENTS

| | | |
|---|---|---|
| JP | 09-258269 | 10/1997 |
| JP | 10-003092 | 1/1998 |
| JP | 11-174481 | 7/1999 |
| JP | 2000-227596 | 8/2000 |
| JP | 2000-305100 | 11/2000 |
| KR | 1019990086578 | 12/1999 |
| KR | 1020020080860 | 10/2002 |
| TW | 487818 | 5/2002 |

THIN FILM TRANSISTOR ARRAY PANEL FOR LIQUID CRYSTAL DISPLAY

CROSS-REFERENCE TO RELATED PATENT APPLICATIONS

This application is a continuation application of U.S. patent application Ser. No. 11/954,121 filed on Dec. 11, 2007 now U.S. Pat. No. 7,609,351 which is a continuation of U.S. patent application Ser. No. 10/725,133, filed on Dec. 1, 2003 now U.S. Pat. No. 7,317,503, which claims foreign priority under 35 U.S.C. §119 to Korean Patent Application No. 2002-76356, filed on Dec. 3, 2002, the disclosures of which are herein incorporated by reference in their entireties.

BACKGROUND OF THE INVENTION (a) Technical Field

The present disclosure relates to a thin film transistor array panel for a liquid crystal display, and in particular, to a thin film transistor array panel including two kinds of field-generating electrodes for generating horizontal electric field.

(b) Description of the Related Art

A conventional liquid crystal display (hereinafter LCD) using horizontal electric field includes pixel electrodes and common electrodes for generating horizontal electric field. An LCD cannot display a high quality image when the behaviors of the liquid crystal molecules are distorted, such as when the common electrodes and a common electrode line connected to the common electrodes for transmitting a common signal are adjacent to each other, generally near a edge portion of a pixel. A wider black matrix may be used to cover the distorted portion of the pixel but it reduces aperture ratio and result in lower brightness of the display.

In addition, cross-talk coupling effect or electric field distortion, which generally occurs between adjacent current carrying lines and electrodes such as between a data signal line and a pixel electrode or a common electrode and a data signal line causes light leakage. Thus, in the conventional technology a common electrode adjacent to the data signal line is made with a width adequate to cover a region of the coupling effect or field distortion. However, the wider coverage reduces the aperture ratio.

Furthermore, since the common electrode or the pixel electrode extend parallel to the data signal line, generally along a longer lengthwise direction of a pixel, the number of electrodes that can be placed thereto is limited.

SUMMARY OF THE INVENTION

It is an aspect of the present invention to provide a high quality image display, minimizing the effect from the distorted electric field of image signal in a liquid crystal display device.

According to one aspect of the present disclosure, a liquid crystal display comprises; a substrate, a first signal line formed on the substrate and extending in a direction, a second signal line intersecting but insulated from the first signal line, a first pixel electrode formed in a pixel area defined by intersections of the first signal line and the second signal line, said first pixel electrodes substantially parallel to the first signal line, a pixel signal line connected to the pixel electrode, a switching element connected to the first signal line, the second signal line, and the pixel signal line, a first common electrode formed in the pixel area, said first common electrode parallel to said first pixel electrode, a common signal line formed in the pixel area, said common signal line connected to said common electrode, a first capacitor electrode formed in the pixel area, said first capacitor electrode connected to the pixel signal line, a second capacitor electrode formed in the pixel area, said second capacitor electrode connected to said common signal line, a second pixel electrode formed in the pixel area, said second pixel electrode opposite to first pixel electrode with respect to said capacitor electrode and connected to the pixel signal line, and a second common electrode formed in the pixel area, said second common electrode opposite to the first common electrode with respect to said capacitor electrode and connected to the common signal line, wherein said first signal line is curved at near the switching element.

According to another aspect of the present disclosure, a liquid crystal display comprises; a first signal line extending in a direction; a second signal line, said second signal line parallel to the first signal line, a third signal line having a positive angle with respect to a perpendicular direction of the first signal line, said third signal line intersecting the first signal line, a fourth signal line having a negative angle with respect to a perpendicular direction of the first signal line, said fourth signal line intersecting the first signal line, a pixel area having a first part, a second part and a third part, said pixel area defined by the first, second, third and fourth signal lines, a first common electrode extending parallel to the third signal line, said first common electrode disposed in the first part of the pixel, a first pixel electrode extending parallel to the third signal line, said first pixel electrode disposed in the first part of the pixel area, a second common electrode having a first line and a second line, said first line parallel to the third signal line, said second line parallel to the fourth signal line and said second common electrode disposed in the second part of the pixel area, a second pixel electrode having a third line and a fourth line, said the third line parallel to the third signal line, said fourth line parallel to the fourth signal line and said second pixel electrode disposed in said the second part of the pixel area, a first capacitor electrode electrically connected to the common electrode, said first capacitor electrode disposed in said the second part of the pixel area, a second capacitor electrode electrically connected to the pixel electrode, said second capacitor electrode disposed in said second part of the pixel area, a third common electrode extending parallel to the fourth signal line, said third common electrode disposed in said third part of the pixel area, and a third pixel electrode extending parallel to the fourth signal line, said third pixel electrode disposed in the third part of the pixel area.

The pixel signal line overlaps the common signal line. The common signal line is parallel to the second signal line, which is disposed to the second signal line nearer than the pixel signal line disposed to the switching element. It decreases the effect of electric field distortion arisen from a data signal line and enables to expand transmittable area within the pixel.

The first signal is curved at a positive or negative angle with respect to the perpendicular direction of the second signal line or a rubbing direction on the substrate depending on a polarizing axis. It enables to make a shape of the pixel trapezoid, echelon or others, which also help to decrease or compensate the optical difference of a liquid crystal. The shape of the pixel area may be a rectangular or others.

A storage capacitor formed of the first capacitor electrode and the second capacitor electrode including a insulator interposed, is disposed in the middle of a longitudinal direction of the pixel, or where a texture may be formed during displaying. The capacitor electrode may be a shape of triangle or other.

The first common electrode is disposed nearer to a gate signal line than the first pixel electrode. The second common electrode is also disposed nearer to a gate signal line than the second pixel electrode. It also decrease the effect of electric field distortion arisen from the gate signal line, which also improve an image quality and enables to expand the transmissible area of the pixel.

The pixel area of the liquid crystal is repeated in a direction of the gate signal line expanding direction, or symmetrically with respect to a data signal line therebetween.

The pixel electrode and the common electrode may be disposed on the same planar place. The common electrode and the pixel electrode may have a thickness of less than about 2000 Å.

The gate line may include a single film of such as Ag, Ag alloy, Al, Al alloy or their alloys. The gate line may also have a multi-layered structure including one of the above-described layers and/or one of a pad layer.

The pixel electrode and common electrode may be formed of plural parallelism of the two electrodes.

BRIEF DESCRIPTION OF THE DRAWINGS

The present invention will become more apparent by describing preferred embodiments thereof in detail with reference to the accompanying drawings in which.

DETAILED DESCRIPTION OF PREFERRED EMBODIMENTS

The present invention now will be described more fully hereinafter with reference to the accompanying drawings, in which preferred embodiments of the invention are shown. The present invention may, however, be embodied in many different forms and should not be construed as limited to the embodiments set forth herein.

Thin film transistor (TFT) array panels for an LCD according to embodiments of the present invention will be described with reference to the accompanying drawings.

A plurality of gate lines and a plurality of data lines, defining a plurality of pixel areas, are provided on a TFT array panel for an LCD according to the present invention. A plurality of common signal lines, connected to the common electrodes, extend parallel to the data lines or the gate lines. In the absence of electric field liquid crystal molecules are aligned perpendicular to the data lines or the common signals lines, and the gate lines extend parallel to the common electrodes.

A TFT array panel for an LCD according to a first embodiment of the present invention is now described with reference to FIGS. 1-3.

Figure 1:
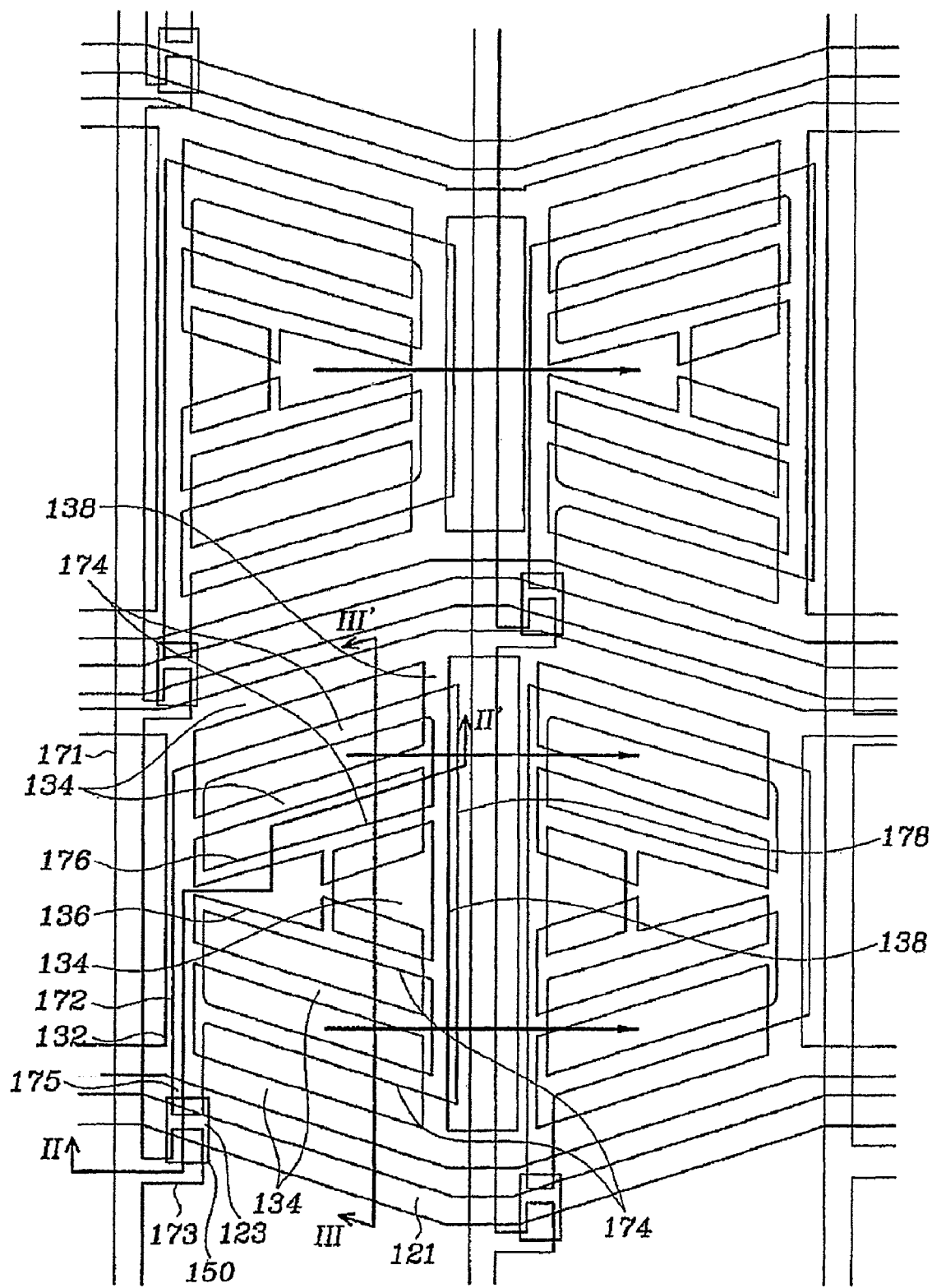
FIG. 1 is a schematic layout view of a thin film transistor (TFT) array panel for an LCD according to a first embodiment of the present invention.
Figure 2:
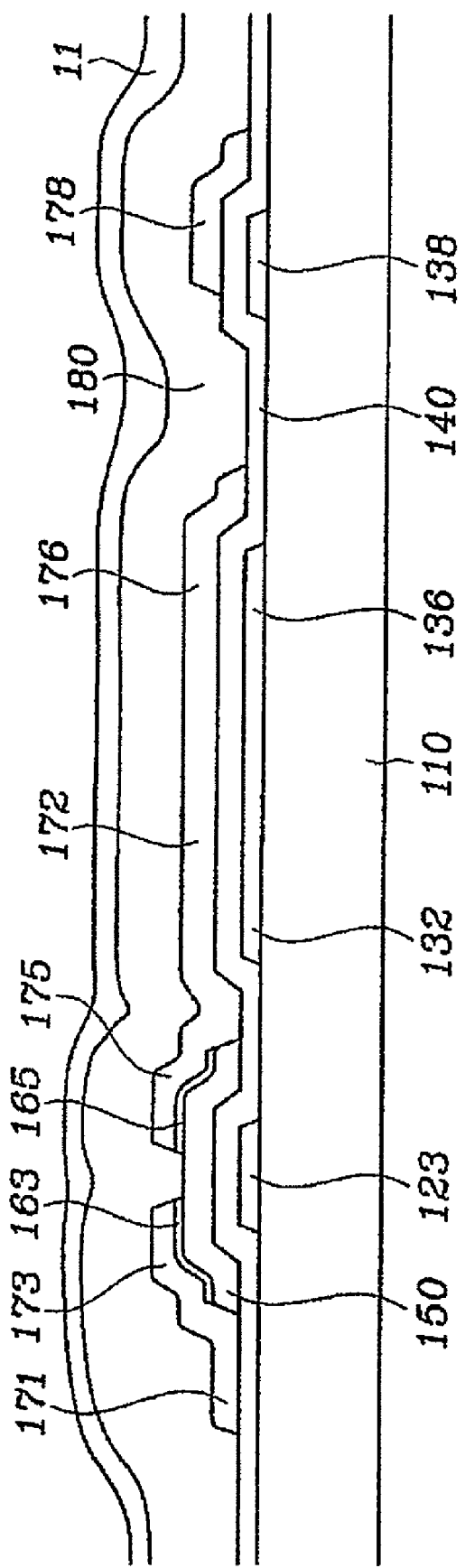
FIG. 2 is a sectional view of the TFT array panel shown in FIG. 1 taken along the line II-II'.
Figure 3:
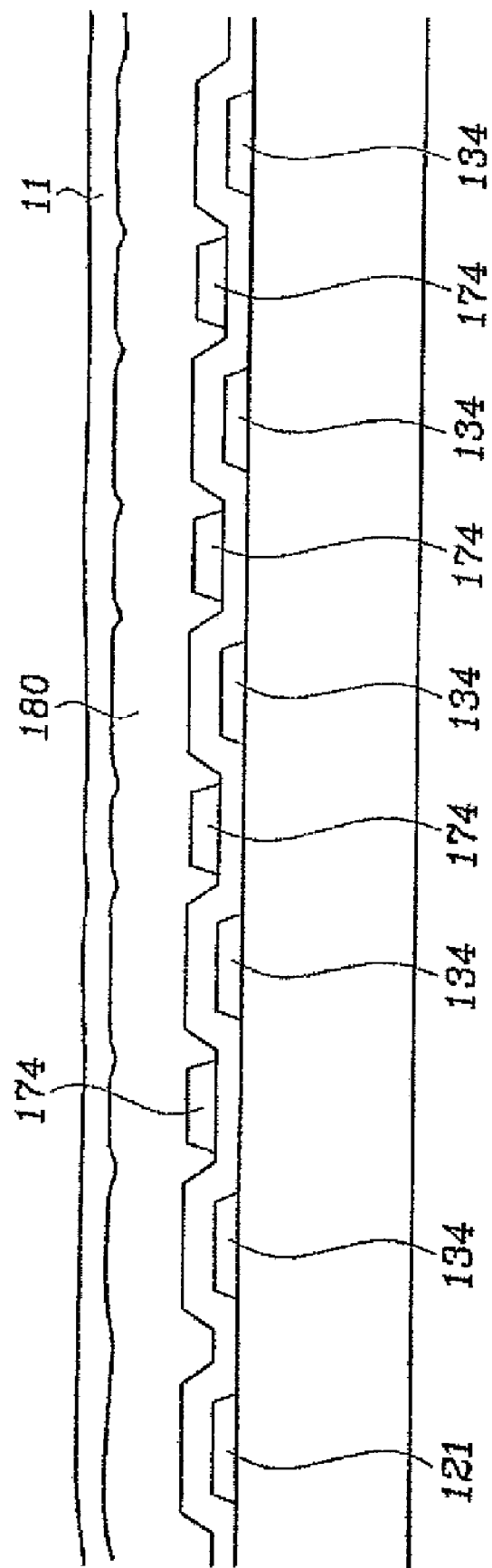
FIG. 3 is a sectional view of the TFT array panel shown in FIG. 1 taken along the line III-III'.

FIG. 1 is a schematic layout view of a pixel in a TFT array panel for an LCD according to a first embodiment of the present invention, and FIGS. 2 and 3 are sectional views of the TFT array panel shown in FIG. 1 taken along the lines II-II' and III-III', respectively.

Referring to FIGS. 1-3, a plurality of gate lines 121 extending substantially in a transverse direction are formed on an insulating substrate 110. The gate lines 121 may include a single film having low resistivity such as Ag, Ag alloy, Al or Al alloy. The gate lines 121 may also have a multi-layered structure including one of the above-described layers and/or one of a pad layer having good contact characteristics with other materials. An end portion of each gate line 121 transmits a gate signal to the gate line 121 and a plurality of branches of each gate line 121 constitutes a plurality of gate electrodes 123 of TFTs. The gate lines 121 intersect data lines and define a plurality of pixel areas. Preferably, the gate lines are slightly angled at or near the curves of a pixel to form trapezoids.

Figure 4:
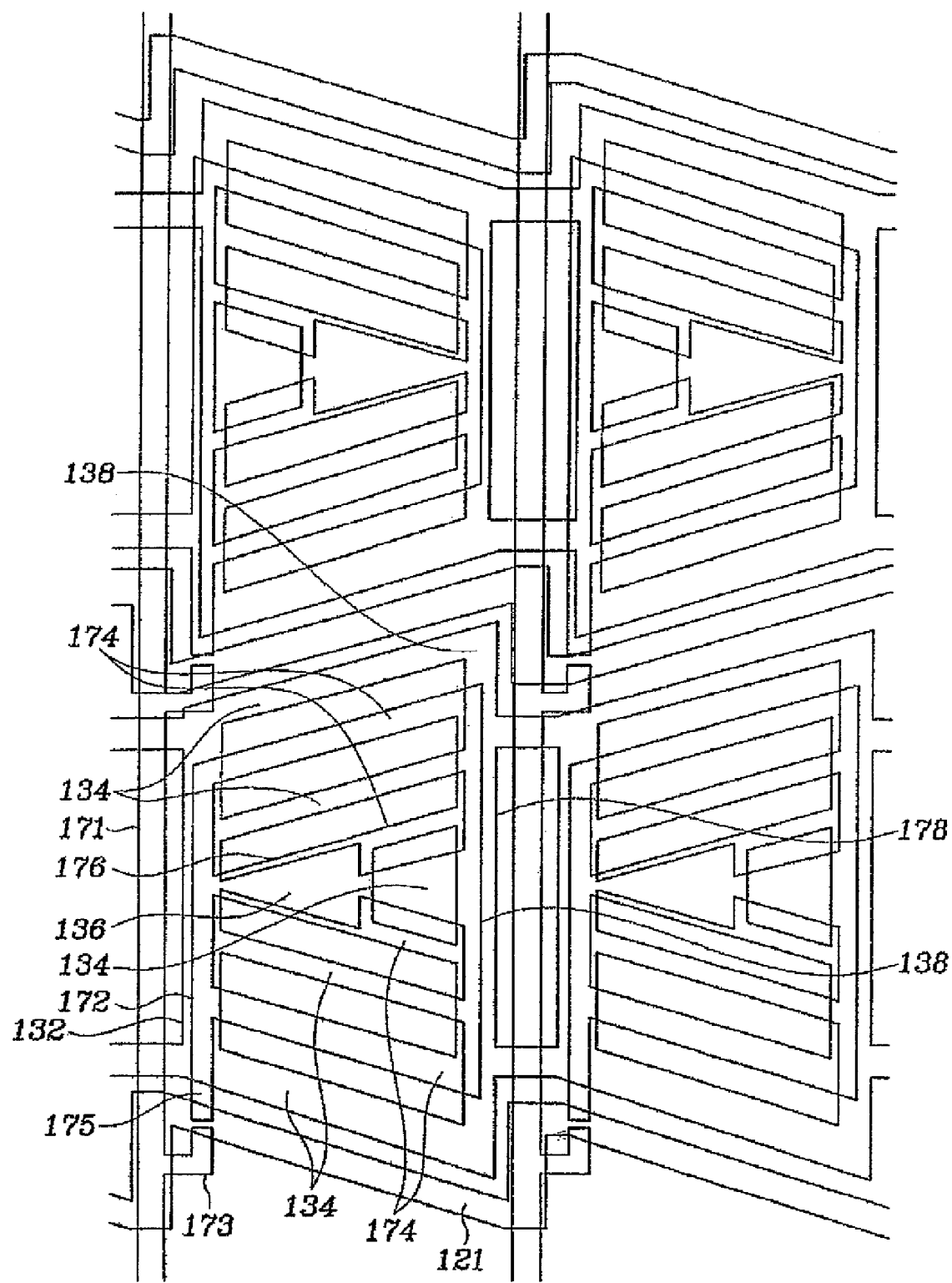
FIG. 4 is a schematic layout view of a TFT array panel for an LCD according to a second embodiment of the present invention.

Furthermore, a plurality of common electrode lines 138 and 132 are formed on the substrate 110. The common electrode lines 138 and 132 extend in a longitudinal direction and parallel to each other. A plurality of common electrodes 134 connecting the common electrode lines 138 and 132 and extending parallel to the gate lines 121 are also formed on the substrate 110. The common electrodes 134 and the common electrode lines 138 and 132 are disposed at or near the edges of the pixel to form trapezoids. A plurality of first storage capacitor conductors 136, connected to the common electrode lines 138 and 132 or the common electrodes 134 overlap a plurality of second storage capacitor conductors 176 connected to pixel electrodes, forming storage capacitors in a central area of the respective pixel area. The common electrodes 134 and the common electrode lines 138 and 132 are referred to as common signal lines hereinafter. The common electrodes may also be formed symmetrically in a pixel. One half of the common lines may be parallel to a first gate line and a second half of the common lines parallel to a second gate line, the first and second gate lines intersecting each other, as shown in FIGS. 1 and 4. This structure is applicable to a multi-domain pixel as well as a multi-pixel unit.

A gate insulating layer 140 made of silicon nitride (SiNx) is formed on the gate lines 121 and the common signal lines 132, 134, 136 and 138.

A plurality of semiconductor islands 150 made of hydrogenated amorphous silicon (hereinafter a-Si) are formed on the gate insulating layer 140. A plurality of pairs of ohmic contacts 163 and 165, made of silicide or n+ a-Si heavily doped with n type impurity, are formed on the semiconductor stripes 151. Each pair of ohmic contacts 163 and 165 are separated with respect to the gate electrodes 123. The semiconductors 150 and the ohmic contacts 163 and 165 may have a linear shape along data lines 171 or may have the same shape as the data lines 171 and drain electrodes 175.

A plurality of data lines 171 and a plurality of drain electrodes 175 are formed on the ohmic contacts 163 and 165 and the gate insulating layer 140. The data lines 171 and the drain electrodes 175 may include a conductive layer having low resistivity such as Al, Ag or its alloy. The data lines 171 extend substantially in the longitudinal direction and intersect the gate lines 121 to define a pixel area in various shapes such as an echelon rectangular, trapezoidal, etc. A plurality of branches of each data line 171 extend onto the ohmic contacts 163 to form a plurality of TFT source electrodes 173. An end portion (not shown) of each data line 171 transmits image signals to the data lines 171. The drain electrodes 175 are separated from the data lines 171 and located on the ohmic contacts 165 opposite the source electrodes 173 with respect to the gate electrodes 123.

According to a preferred embodiment of the invention, a plurality of pixel electrodes 174, a plurality of pixel electrode lines 172 and 178, and a plurality of second storage capacitor conductors 176 are formed on the gate insulating layer 140. The pixel electrodes 174 extend opposite the common electrodes 134. The pixel electrode lines 172 and 178 are connected to the drain electrodes 175 and located near the edges of the pixel areas and overlap the common electrode lines 132 and 138. The second storage capacitor conductors 176 are connected to the pixel electrode lines 172 and overlap the first storage capacitor conductors 136 to form storage capacitors. The pixel electrodes 174 and the pixel electrode lines 172 and 178 are referred to as a pixel signal lines hereinafter.

A passivation layer 180 is formed on the data lines 171, the drain electrodes 175, the pixel signal lines 172, 174 and 178, and the exposed portions of the semiconductor islands 150. The passivation layer 180 is preferably made of silicon nitride or organic material having a good flatness characteristic.

An alignment layer 11 for aligning liquid crystal molecules is formed on the passivation layer 180.

A gate electrode 123, a source electrode 173, and a drain electrode 175 along with a semiconductor island 154 and a pair of ohmic contacts 163 and 165 form a TFT.

Although the common signal lines 132, 134 and 138 and the pixel signal lines 172, 174 and 178 are formed of the same layer as the gate lines 121 and the data lines 171, respectively, they may be on the same layer, for example, they may be located on the passivation layer 180. The common signal lines 132, 134 and 138 and the pixel signal lines 172, 174 and 178 preferably have thickness equal to or less than about 2,000 Å. This thickness presents alignment defect due to height difference.

Transverse arrows shown in FIG. 1 indicate a rubbing direction at the alignment layer 11 which is perpendicular to the data lines 171 or the common signal lines 132. The rubbing direction can be in directions other than that shown by the arrows.

In a TFT array panel for an LCD according to the first embodiment the common signal lines 132 extend parallel to the data lines 171 along long edges of the pixel areas. The rubbing direction is also determined such that in absence of electric field the liquid crystal molecules are aligned perpendicular to the data lines 171. Accordingly, an electric field generated by the voltage difference between the data lines 171 and the common signal lines 132 orients the liquid crystal molecules to their initial orientations. The corresponding areas are displayed dark to prevent lateral crosstalk. As a result, the common signal lines 132 can be made to have a small width and aperture ratio can be increased.

In addition, since the common electrodes 134 and the pixel electrodes 174 are arranged along a long edge direction of the pixel areas the number of the electrodes 134 and 174 and their positioning can be easily varied.

Furthermore, the effective display area can be enlarged to corners of the pixel areas because the pixel electrodes 174 or the common electrodes 134 located near the edges of the pixel areas extend parallel to the edges of the pixel areas defined by the gate lines 121 and the data lines 171. Moreover, the storage capacitors are located near the centers of the pixel area, where textures are generated so that they do not reduce the transmittance of the pixel areas, thereby maximizing the transmittance of the pixel areas.

Although the above-described first embodiment arranges two adjacent trapezoidal pixel electrodes in a row such that bottom edges or top edges of the trapezoids face each other as shown in FIGS. 1 to 3, a bottom edge of a pixel area may face a top edge of an adjacent pixel area in the row direction and vice versa, which is now described with reference to FIG. 4.

FIG. 4 is a layout view of a TFT array panel for an LCD according to a second embodiment. The section view of the TFT array panel according to the second embodiment is similar to that of the first embodiment of the present invention. The pixel areas, however, are repeatedly arranged in a row direction. That is, the adjacent pixel areas in a pixel row have the same shape, while those shown in FIG. 1 have inverted or reversed shapes such that they are symmetrical with respect to a data line located therebetween.

As described above, the placement of the common signal lines and the data in parallel along edges of the pixel areas and reduces light leakage. In addition, the parallelism between the common electrodes and the pixel electrodes or edges of the trapezoidal pixel areas extends display to the corners of the pixel areas, thereby maximizing display capacity of pixels. Moreover, the arrangement of the common electrodes and the pixel electrodes along a long edge direction of the pixels facilitates to a more varied placement the electrodes increases the aperture ratio.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display, comprising:
    a substrate;
    a first signal line formed on the substrate;
    a second signal line intersecting the first signal line;
    a first pixel electrode having a bar shape;
    a second pixel electrode having a bar shape, and forming an acute angle with respect to the first pixel electrode;
    a center pixel electrode formed between the first pixel electrode and the second pixel electrode and comprising a triangle portion and at least one extended portion stretched out from the triangle portion and parallel to one of the first pixel electrode and the second pixel electrode;
    a first pixel signal line connecting the first pixel electrode, the second pixel electrode, and the center pixel electrode;
    a switching element connected to the first signal line, the second signal line, and the first pixel signal line;
    a common electrode formed on the substrate and forming an electric field along with the first pixel electrode, the second pixel electrode, and the center pixel electrode; and
    a second pixel signal line connecting the first pixel electrode, the second pixel electrode, and at least one end of the at least one extended portion of the center pixel electrode.

2. The liquid crystal display of claim 1, wherein the at least one extended portion is formed along an imaginary straight line extended from a side of the triangle portion.

3. The liquid crystal display of claim 2, wherein an apex of the triangle portion is connected to the first pixel signal line.

4. The liquid crystal display of claim 3, wherein the second pixel signal line is parallel to the first pixel signal line.

5. The liquid crystal display of claim 4, wherein the first pixel signal line is parallel to the second signal line.

6. The liquid crystal display of claim 5, wherein the first signal line bends at a positive or negative angle with respect to the perpendicular direction of the second signal line.

7. The liquid crystal display of claim 6, wherein the common electrode comprises a first common electrode parallel to the first pixel electrode, a second common electrode parallel to the second pixel electrode, and a common signal line connecting the first common electrode and the second common electrode.

8. The liquid crystal display of claim 1, wherein an apex of the triangle portion is connected to the first pixel signal line.

9. The liquid crystal display of claim 8, wherein the second pixel signal line is parallel to the first pixel signal line.

10. The liquid crystal display of claim 9, wherein the first pixel signal line is parallel to the second signal line.

11. The liquid crystal display of claim 10, wherein the first signal line bends at a positive or negative angle with respect to the perpendicular direction of the second signal line.

12. The liquid crystal display of claim 11, wherein the common electrode comprises a first common electrode parallel to the first pixel electrode, a second common electrode parallel to the second pixel electrode, and a common signal line connecting the first common electrode and the second common electrode.

13. The liquid crystal display of claim 1, wherein the second pixel signal line is parallel to the first pixel signal line.

14. The liquid crystal display of claim 13, wherein the first pixel signal line is parallel to the second signal line.

15. The liquid crystal display of claim 14, wherein the first signal line bends at a positive or negative angle with respect to the perpendicular direction of the second signal line.

16. The liquid crystal display of claim 15, wherein the common electrode comprises a first common electrode parallel to the first pixel electrode, a second common electrode parallel to the second pixel electrode, and a common signal line connecting the first common electrode and the second common electrode.

17. The liquid crystal display of claim 1, wherein the first pixel signal line is parallel to the second signal line.

18. The liquid crystal display of claim 17, wherein the first signal line bends at a positive or negative angle with respect to the perpendicular direction of the second signal line.

19. The liquid crystal display of claim 18, wherein the common electrode comprises a first common electrode parallel to the first pixel electrode, a second common electrode parallel to the second pixel electrode, and a common signal line connecting the first common electrode and the second common electrode.

20. The liquid crystal display of claim 1, wherein the first signal line bends at a positive or negative angle with respect to the perpendicular direction of the second signal line.

21. The liquid crystal display of claim 20, wherein the common electrode comprises a first common electrode parallel to the first pixel electrode, a second common electrode parallel to the second pixel electrode, and a common signal line connecting the first common electrode and the second common electrode.

22. The liquid crystal display of claim 1, wherein the common electrode comprises a first common electrode parallel to the first pixel electrode, a second common electrode parallel to the second pixel electrode, and a common signal line connecting the first common electrode and the second common electrode.

23. A liquid crystal display, comprising:
a substrate;
a first signal line formed on the substrate;
a second signal line intersecting the first signal line;
a first pixel electrode having a bar shape;
a second pixel electrode having a bar shape, and forming an acute angle with respect to the first pixel electrode;
a center pixel electrode formed between the first pixel electrode and the second pixel electrode and comprising a triangle portion, a first extended portion stretched out from the triangle portion, and a second extended portion stretched out from the triangle portion;
a first pixel signal line connecting the first pixel electrode, the second pixel electrode, and the center pixel electrode;
a switching element connected to the first signal line, the second signal line, and the first pixel signal line;
a common electrode formed on the substrate and forming an electric field along with the first pixel electrode, the second pixel electrode, and the center pixel electrode; and
a second pixel signal line connecting the first pixel electrode, the second pixel Electrode, and ends of the first extended portion and the second extended portion of the center pixel electrode.

24. The liquid crystal display of claim 23, wherein the first extended portion is formed along an imaginary straight line extended from a first side of the triangle portion, and the second extended portion is formed along an imaginary straight line extended from a second side of the triangle portion.

25. The liquid crystal display of claim 24, wherein an apex of the triangle portion is connected to the first pixel signal line.

26. The liquid crystal display of claim 25, wherein the second pixel signal line is parallel to the first pixel signal line.

27. The liquid crystal display of claim 26, wherein the first pixel signal line is parallel to the second signal line.

28. The liquid crystal display of claim 27, wherein the first signal line bends at a positive or negative angle with respect to the perpendicular direction of the second signal line.

29. The liquid crystal display of claim 28, wherein the common electrode comprises a first common electrode parallel to the first pixel electrode, a second common electrode parallel to the second pixel electrode, and a common signal line connecting the first common electrode and the second common electrode.

30. The liquid crystal display of claim 23, wherein an apex of the triangle portion is connected to the first pixel signal line.

31. The liquid crystal display of claim 30, wherein the second pixel signal line is parallel to the first pixel signal line.

32. The liquid crystal display of claim 31, wherein the first pixel signal line is parallel to the second signal line.

33. The liquid crystal display of claim 32, wherein the first signal line bends at a positive or negative angle with respect to the perpendicular direction of the second signal line.

34. The liquid crystal display of claim 33, wherein the common electrode comprises a first common electrode parallel to the first pixel electrode, a second common electrode parallel to the second pixel electrode, and a common signal line connecting the first common electrode and the second common electrode.

35. The liquid crystal display of claim 23, wherein the second pixel signal line is parallel to the first pixel signal line.

36. The liquid crystal display of claim 35, wherein the first pixel signal line is parallel to the second signal line.

37. The liquid crystal display of claim 36, wherein the first signal line bends at a positive or negative angle with respect to the perpendicular direction of the second signal line.

38. The liquid crystal display of claim 37, wherein the common electrode comprises a first common electrode parallel to the first pixel electrode, a second common electrode parallel to the second pixel electrode, and a common signal line connecting the first common electrode and the second common electrode.

39. The liquid crystal display of claim 23, wherein the first pixel signal line is parallel to the second signal line.

40. The liquid crystal display of claim 39, wherein the first signal line bends at a positive or negative angle with respect to the perpendicular direction of the second signal line.

41. The liquid crystal display of claim 40, wherein the common electrode comprises a first common electrode parallel to the first pixel electrode, a second common electrode parallel to the second pixel electrode, and a common signal line connecting the first common electrode and the second common electrode.

42. The liquid crystal display of claim 23, wherein the first signal line bends at a positive or negative angle with respect to the perpendicular direction of the second signal line.

43. The liquid crystal display of claim 42, wherein the common electrode comprises a first common electrode parallel to the first pixel electrode, a second common electrode parallel to the second pixel electrode, and a common signal line connecting the first common electrode and the second common electrode.

44. The liquid crystal display of claim 23, wherein the common electrode comprises a first common electrode parallel to the first pixel electrode, a second common electrode parallel to the second pixel electrode, and a common signal line connecting the first common electrode and the second common electrode.

\* \* \* \* \*